US008010427B2

(12) United States Patent
Suzuki (10) Patent No.: US 8,010,427 B2
(45) Date of Patent: Aug. 30, 2011

(54) COMPUTER SYSTEM CONNECTED TO ELECTRONIC-COMMERCE SERVER AND METHOD AND PROGRAM FOR SUPPORTING INPUT OF NUMERICAL VALUE REQUIRED FOR PERFORMANCE OF ELECTRONIC-COMMERCE TRANSACTION

(75) Inventor: Kazuhiro Suzuki, Saitame-ken (JP)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 11/775,273

(22) Filed: Jul. 10, 2007

(65) Prior Publication Data

US 2008/0215347 A1    Sep. 4, 2008

(30) Foreign Application Priority Data

Jul. 31, 2006  (JP) ................................ 2006-208021

(51) Int. Cl.
*G06Q 40/00* (2006.01)
(52) U.S. Cl. ............ 705/35; 705/37; 705/36 R; 273/278
(58) Field of Classification Search .............. 705/14.23, 705/36 R, 37, 35; 273/278
See application file for complete search history.

(56) References Cited

U.S. PATENT DOCUMENTS

| | | | | |
|---|---|---|---|---|
| 2001/0030395 A1* | 10/2001 | Sunday | | 273/278 |
| 2002/0198813 A1* | 12/2002 | Patterson et al. | | 705/36 |
| 2006/0069633 A1* | 3/2006 | Breslow et al. | | 705/35 |
| 2006/0265315 A1* | 11/2006 | Friesen et al. | | 705/37 |
| 2009/0177543 A1* | 7/2009 | Ram et al. | | 705/14 |

FOREIGN PATENT DOCUMENTS

| | | |
|---|---|---|
| JP | 5265689 | 10/1993 |
| JP | 06-004258 | 1/1994 |
| JP | 9-16794 | 1/1997 |
| JP | 09-016794 | 1/1997 |
| JP | 09-198443 | 7/1997 |
| JP | 09-237286 | 9/1997 |
| JP | 9-237286 | 9/1997 |

(Continued)

OTHER PUBLICATIONS

Leitzes, Adam; Solan, Joshua; Charles, Cathy; Malik, Om; et al, Forbes Interactive Money Guide's best of the Web: Stocks and bonds, Fall 1999, Forbes, v 164, n6, p. 46-69.*

(Continued)

*Primary Examiner* — Behrang Badii
(74) *Attorney, Agent, or Firm* — Schmeiser, Olsen & Watts; John Pivnichny (57) ABSTRACT

A computer system which is connected to an electronic-commerce server includes a display unit, a monitoring unit, a table, a display control unit, and a transmitting unit. The display unit displays a combination of a numeric input field and an icon display area associated with the numeric input field. The monitoring unit monitors an input to the numeric input field. The table defines a correspondence between an entry in the numeric input field and an icon associated with the numeric input field. The display control unit causes, based on the table definition, an icon to be displayed before a transmission action is received, where the icon corresponds to the magnitude of the numeric value entered in the numeric input field. The transmitting unit transmits the numeric value entered in the numeric input field to the electronic-commerce server in response to receipt of the transmission action.

17 Claims, 9 Drawing Sheets

FOREIGN PATENT DOCUMENTS

| | | |
|---|---|---|
| JP | 2001143158 A | 5/2001 |
| JP | 2002-541588 | 3/2002 |
| JP | 2002-122445 | 4/2002 |
| JP | 2002236828 | 8/2002 |
| JP | 2004-025731 | 7/2004 |
| JP | 2004-194347 | 7/2004 |
| JP | 2005-055951 | 3/2005 |
| JP | 2005-55951 | 3/2005 |
| JP | 2005122505 | 5/2005 |
| JP | 2006135392 | 5/2006 |
| WO | 2007/014790 | 2/2007 |

OTHER PUBLICATIONS

Kazuhiro Koki, "Ajax Hajimemashita", Web Designing 2006 vol. 6, published by Mainichi Communications, pp. 144-147, especially p. 146 left column.

Yuuichi Tateno, "Easy Ajax Development! with Ruby on Rails", Kaihatsu-no-Genba 2005 vol. 002, published by shoueisya, pp. 170-181.

* cited by examiner

COMPUTER SYSTEM CONNECTED TO ELECTRONIC-COMMERCE SERVER AND METHOD AND PROGRAM FOR SUPPORTING INPUT OF NUMERICAL VALUE REQUIRED FOR PERFORMANCE OF ELECTRONIC-COMMERCE TRANSACTION

CROSS-REFERENCE TO RELATED APPLICATIONS

This application claims priority from Japanese Patent Application Serial No. 2006-208021 filed on Jul. 31, 2006.

FIELD OF THE INVENTION

This invention relates generally to the field of information processing technologies, and more particularly to a computer system connected to an electronic-commerce server and a method and a program for supporting an input of a numerical value required for performance of an electronic-commerce transaction.

BACKGROUND OF THE INVENTION

With the marked proliferation of computers and information technology, in particular, of the Internet, electronic-commerce transactions, for example, online stock trading, are being increasingly conducted. Generally, for electronic commerce, a customer interactively enters information required for conducting an electronic-commerce transaction (e.g., an item to be traded and a quantity of an item to be traded) through a graphical user interface (GUI) displayed on a client computer. Then, the client computer transmits entered information to a server over a network, and execution of an electronic-commerce program carries out the transaction. Operational error in such an information input causes incorrect orders. This becomes a cause of not only individual troubles but also a decreased reliability of electronic-commerce trading. Therefore, corporations that conduct electronic-commerce trading and companies in the computer industry that construct electronic-commerce systems have developed techniques for preventing an incorrect input.

Japanese Unexamined Patent Application Publication No. 2005-055951 discloses a technique that enables a complex web application having an input support function that can prevent erroneous input/registration to be easily generated from a framework of business specifications. This technique aims to greatly reduce development work of the web application and change maintenance work resulting from changes in the business specifications and thus greatly shorten a development period.

Japanese Unexamined Patent Application Publication No. 2004-194347 discloses a technique in which, when a predetermined program is selected from a still picture composed of size-reduced pictures shown as an electronic program guide, if the selected program is currently broadcasted, the program is immediately displayed, and if the selected program will be broadcasted in future, a detailed picture of the program is displayed.

Japanese Unexamined Patent Application Publication No. 9-016794 discloses a technique that successively determines a graphic to be selected by an operator while the operator is selecting the graphic, on the basis of a graphic specified by the operator, an operation command with selection of a graphic, and a parameter associated with the operation command, and visually feeds back the selected graphic in succession.

PCT Japanese Translation Patent Publication No. 2002-541588 discloses a user interface for an electronic trading system that allows a remote trader to view trends in the orders for an item, and provides the trading information in an easy to see and interpret graphical format.

Japanese Unexamined Patent Application Publication No. 9-237286 discloses a computer aided design (CAD) system that allows a user to establish various settings for the position and shape of an object with ease. According to this CAD system, a creator of a graphic drawing refers to a value set for a parameter displayed in a parameter field for use in execution of a selected command and finds the parameter required for the execution of the selected parameter. In response to an instruction to execute the command, the position and shape of an object is determined by use of the value set for the parameter and the object is placed in a graphic-drawing display area.

Japanese Unexamined Patent Application Publication No. 2002-122446 discloses an apparatus that can display measurement values without having to be upsized. In this apparatus, a standard display bar, an upper-limit alarm display bar, and a lower-limit alarm display bar are flashed in a display unit such that a standard value is set in consideration of the value of a measured current, voltage, power or the like, the upper-limit alarm value and the lower-limit alarm value are derived and set according to the magnitude of the standard value, or the standard value, upper limit alarm value, and lower limit alarm value are derived and set according to the magnitude of a set maximum scale value.

In the field of specific electronic commerce, for example, online stock trading, it is necessary to promptly enter data to the second to respond to a stock price, which changes every moment. Once data is transmitted and an electronic-commerce transaction is processed by a program, the cancellation of the trade is very difficult in general. Therefore, reversely entering a numeric value for a price of a share and that for the quantity of shares to be traded can possibly result in a critical loss, and such a situation actually occurred.

SUMMARY OF THE INVENTION

Briefly stated, a computer system which is connected to an electronic-commerce server includes a display unit, a monitoring unit, a table, a display control unit, and a transmitting unit. The display unit displays a combination of a numeric input field and an icon display area associated with the numeric input field. The monitoring unit monitors an input to the numeric input field. The table defines a correspondence between an entry in the numeric input field and an icon associated with the numeric input field. The display control unit causes, based on the table definition, an icon to be displayed before a transmission action is received, where the icon corresponds to the magnitude of the numeric value entered in the numeric input field. The transmitting unit transmits the numeric value entered in the numeric input field to the electronic-commerce server in response to receipt of the transmission action.

In response to a change in the numeric value entered in the numeric input field, the display control unit may preferably change the icon displayed in the icon display area to an icon corresponding to a magnitude of the changed numeric value. The display control unit can cause the at least one icon corresponding in number to the magnitude of the numeric value entered in the numeric input field to be displayed.

The computer system may preferably further include an icon storing unit that stores different icons each associated with a digit of the numeric value to be entered in the numeric input field. The display control unit may preferably cause an icon corresponding to a magnitude of a numeric value of at least one digit in the entered numeric value to be displayed.

The summary of the present invention as a computer system connected to an electronic-commerce server has been described above. However, the present invention can be a method, program, or program product for supporting an input of a numeric value. Examples of the program product can include a storage medium that stores the foregoing program and a medium that transmits the program.

According to an embodiment of the invention, a computer system connected to an electronic-commerce server includes a display unit that displays at least one combination of a numeric input field in which a numeric value required for performance of an electronic-commerce transaction is to be entered and an icon display area associated with the numeric input field; a monitoring unit that monitors an input to the numeric input field; a table that defines a correspondence between a numeric value to be entered in the numeric input field and an icon to be displayed in the icon display area associated with the numeric input field; a display control unit that causes, based on the table, at least one icon to be displayed in the icon display area before a transmission action is received, the at least one icon corresponding to a magnitude of a numeric value entered in the numeric input field detected by the monitoring unit; and a transmitting unit that transmits the numeric value entered in the numeric input field to the electronic-commerce server in response to reception of the transmission action.

According to an embodiment of the invention, in a computer system connected to an electronic-commerce server, a method for supporting an input of a numeric value required for performance of an electronic-commerce transaction includes the steps of: (a) displaying, on a display unit, at least one combination of a numeric input field in which a numeric value required for performance of an electronic-commerce transaction is to be entered and an icon display area associated with the numeric input field; (b) monitoring an input to the numeric input field; (c) referring to a table that defines a correspondence between a numeric value to be entered in the numeric input field and an icon to be displayed in the icon display area associated with the numeric input field; (d) displaying, based on the table, at least one icon in the icon display area before a transmission action is received, the at least one icon corresponding to a magnitude of a numeric value entered in the numeric input field detected by the step of monitoring the input; and (e) transmitting the numeric value entered in the numeric input field to the electronic-commerce server in response to reception of the transmission action.

According to an embodiment of the invention, a program product for supporting an input of a numeric value required for performance of an electronic-commerce transaction, causes a computer system connected to an electronic-commerce server to execute the steps of: (a) displaying, on a display unit, at least one combination of a numeric input field in which a numeric value required for performance of an electronic-commerce transaction is to be entered and an icon display area associated with the numeric input field; (b) monitoring an input to the numeric input field; (c) referring to a table that defines a correspondence between a numeric value to be entered in the numeric input field and an icon to be displayed in the icon display area associated with the numeric input field; (d) displaying, based on the table, at least one icon in the icon display area before a transmission action is received, the at least one icon corresponding to a magnitude of a numeric value entered in the numeric input field detected by the step of monitoring the input; and (e) transmitting the numeric value entered in the numeric input field to the electronic-commerce server in response to reception of the transmission action.

DETAILED DESCRIPTION OF THE PREFERRED EMBODIMENT

The invention can be implemented in many different modes and should not be interpreted as limiting to the content of the description of the embodiment. It is to be noted that not all combinations of features described in the embodiment are required for the means for solving the problems. The same reference numerals are used for similar elements throughout the description of the embodiment.

Figure 1:
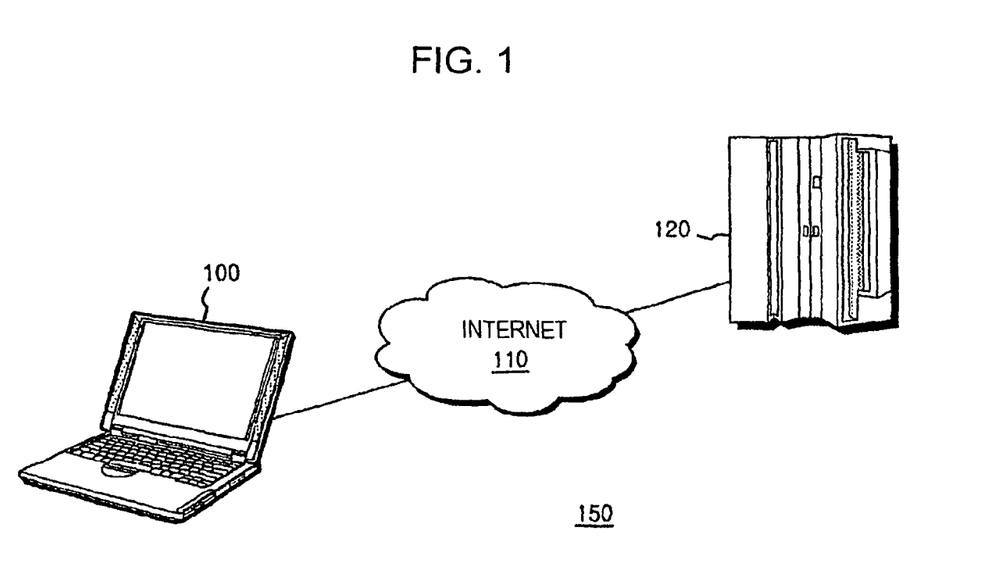
FIG. 1 shows a conceptual diagram of a network system according to an embodiment of the present invention.

FIG. 1 illustrates a conceptual diagram of a network system 150 according to an embodiment of the present invention. The network system 150 according to the present embodiment includes a client computer 100, a network 110, and an electronic-commerce server 120. The client computer 100 and the electronic-commerce server 120 can communicate with each other via the network 110. In the present embodiment, the network 110 is realized as the Internet connecting computers by using TCP/IP.

The client computer 100 according to the present embodiment includes a display device, such as a liquid crystal display, and can visually provide a user with information received from server computers on the network 110, including the electronic-commerce server 120, via the network 110 (e.g., stock quotes and corporation news). The client computer 100 can also transmit information that is required for performance of an electronic-commerce transaction and that is interactively entered by a user through a GUI on the display device to the electronic-commerce server 120 via the network 110.

The electronic-commerce server 120 performs the electronic-commerce transaction by executing an electronic-commerce program on the basis of information received from the client computer 100. Such general knowledge of electronic commerce is well known, so a more detailed description thereof is omitted.

Figure 2:
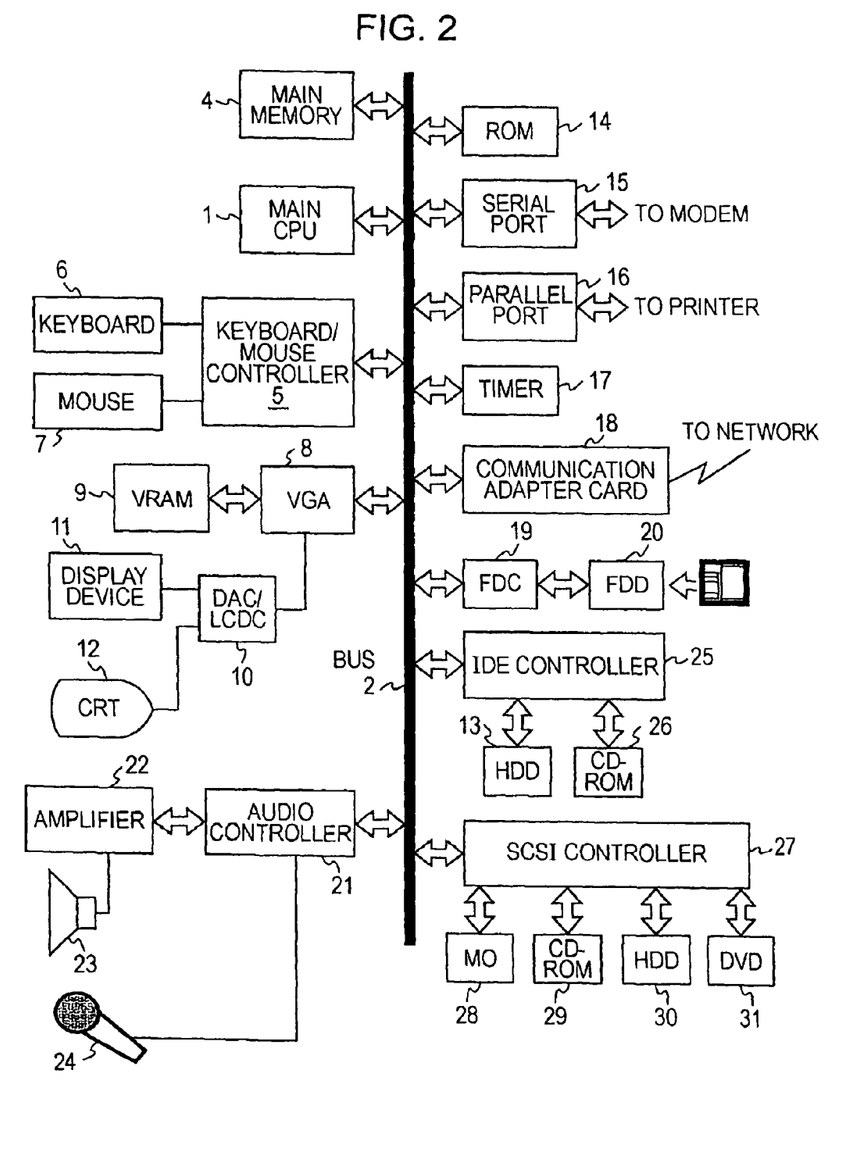
FIG. 2 shows an example of a hardware configuration of an information processing apparatus suited for implementing a client computer and an electronic-commerce server according to the embodiment of the present invention.

FIG. 2 illustrates an example of a hardware configuration of an information processing apparatus suited for implementing the client computer 100 and the electronic-commerce server 120 according to the present embodiment. The information processing apparatus includes a central processing unit (CPU) 1 and a main memory 4, both being connected to a bus 2. Hard disk drives 13 and 30 and removable storages (external storage systems whose recording media are replaceable), such as CD-ROM drives 26 and 29, a flexible disk drive 20, an MO drive 28, and a DVD drive 31, are connected to the bus 2 via an FD controller 19, an IDE controller 25, a SCSI controller 27, and the like.

A storage medium, such as an FD, an MO, a CD-ROM, and a DVD-ROM, is inserted into the removable storage. The storage medium, the hard disk drives 13 and 30, and a ROM 14 can store code of a computer program for providing instructions to a CPU and the like in cooperation with an operating system to carry out the invention. The computer program is executed by being loaded into the main memory 4. The computer program can be compressed. The computer program can also be divided and recorded in a plurality of media.

The information processing apparatus receives an input from an input device, such as a keyboard 6 and a mouse 7, via a keyboard/mouse controller 5. The information processing apparatus is connected to a display device 11 for providing visual data to a user via a DAC/LCDC 10.

The information processing apparatus is connected to a network via a network adapter 18 (e.g., ETHERNET® card or a token-ring card) or the like and can communicate with other computers or the like. Although not illustrated in the drawing, the information processing apparatus can be connected to a printer via a parallel port or to a modem via a serial port.

From the foregoing description, it will be readily understood that an information processing apparatus suited for implementing the client computer 100 and the electronic-commerce server 120 according to the present embodiment of the invention is implemented by an ordinary information processing apparatus, such as a personal computer, a workstation, and a mainframe, or a combination thereof. The components described above are illustrative only, and not all the components are necessarily required for the invention.

It will, of course, be understood that those skilled in the art can readily reach various modifications, such as distribution of the functions of hardware components of the information processing apparatus used in the present embodiment of the invention into a combination of machines. These modifications are concepts contained in the scope of the invention.

The client computer 100 and the electronic-commerce server 120 can adopt an operating system that supports a GUI multi-window environment, such as Windows® operating system from Microsoft Corporation, Mac OS® from Apple Computer Inc., and UNIX® system having X Window System (e.g., AIX® from International Business Machines Corporation).

From the foregoing, it can be understood that each of the client computer 100 and the electronic-commerce server 120 according to the present embodiment of the invention is not limited to a specific multi-window operating system environment.

Figure 3:
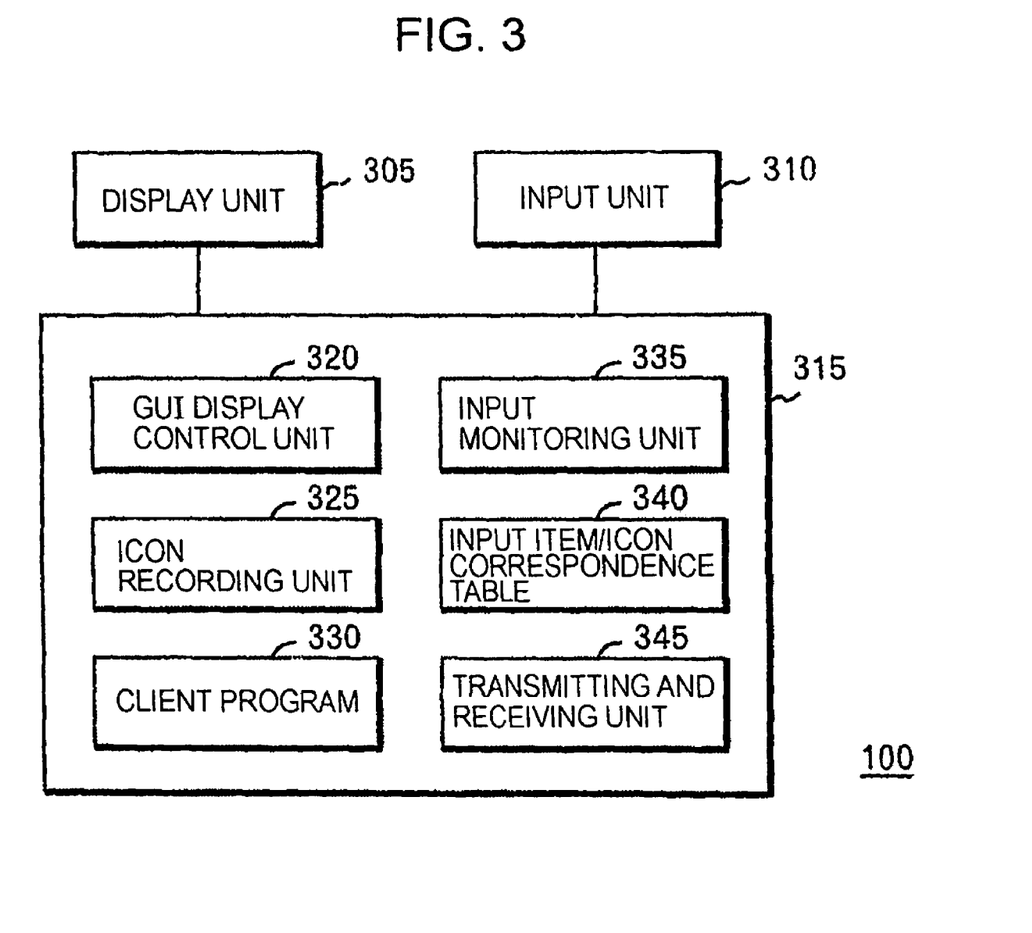
FIG. 3 shows a functional block diagram of the client computer according to the embodiment of the present invention.

FIG. 3 shows a functional block diagram of the client computer 100 according to the present embodiment. The components shown in the functional block diagram of FIG. 3 can be implemented by, in an information processing apparatus that has a hardware configuration illustrated in FIG. 2, loading the operating system and computer program stored in the hard disk drives 13 into the main memory 4, then causing the CPU 1 to read the operating system and computer program, and causing the hardware resources and software to cooperate together.

The client computer 100 includes a display unit 305, an input unit 310, and a data processing unit 315. The display unit 305 displays a desktop screen in the multi-window operating system including a window being a GUI for an input of information required for performance of an electronic-commerce transaction in response to an output signal from the data processing unit 315. The input unit 310 is implemented by the keyboard 6, the mouse 7, and the like. The input unit 310 receives an input from a user who operates the client computer 100.

The data processing unit 315 includes a GUI display control unit 320, an icon recording unit 325, a client program 330, an input monitoring unit 335, an input item/icon correspondence table 340, and a transmitting and receiving unit 345. The client program 330 according to the present embodiment can execute an application program installed by a user who is willing to conduct an electronic-commerce transaction into the client computer 100. The client program 330 can realize operation at a client side in electronic stock trading by appropriate controlling the GUT display control unit 320, input monitoring unit 335, and transmitting and receiving unit 345.

The GUI display control unit 320 according to the present embodiment can control display of a GUI for an input of information required for performance of an electronic-commerce transaction in response to an instruction from the client program 330. The GUI is displayed on the display unit 305 and contains at least one combination of a numeric input field in which at least a numeric value is to be entered and an associated icon display area. The GUI display control unit 320 can display, in the icon display area, an icon whose size corresponds to the magnitude of the numeric value. It is preferable that, in response to a change in the numeric value, the GUI display control unit 320 immediately change the displayed icon into an icon that corresponds to the changed numeric value prior to a transmission action performed by a user. A process for displaying the icon and GUI will be described in greater detail below.

The icon recording unit 325 stores image data of an icon to be displayed in the icon display area in the GUI displayed by the GUI display control unit 320. The input item/icon correspondence table 340 defines a correspondence between information to be entered via the GUI displayed by the GUI display control unit 320 (e.g., a numeric value to be entered in the numeric input field) and an icon to be displayed in the associated icon display area. The details of the correspondence defined in the input item/icon correspondence table 340 stored by the icon recording unit 325 according to the present embodiment will be described below with reference to FIGS. 7(a) to 7(d).

The input monitoring unit 335 continuously monitors a user input from the input unit 310. If a user input is detected, the input monitoring unit 335 can analyze the content of the user input in real time and transmit the analysis result to the client program 330.

The transmitting and receiving unit 345 can receive information regarding a stock market to visually provide the information to a user by displaying the information in a browser (not shown). In response to an instruction from the client program 330, the transmitting and receiving unit 345 can transmit information entered via the GUI to the electronic-commerce server 120 over the network 110.

Figure 4:
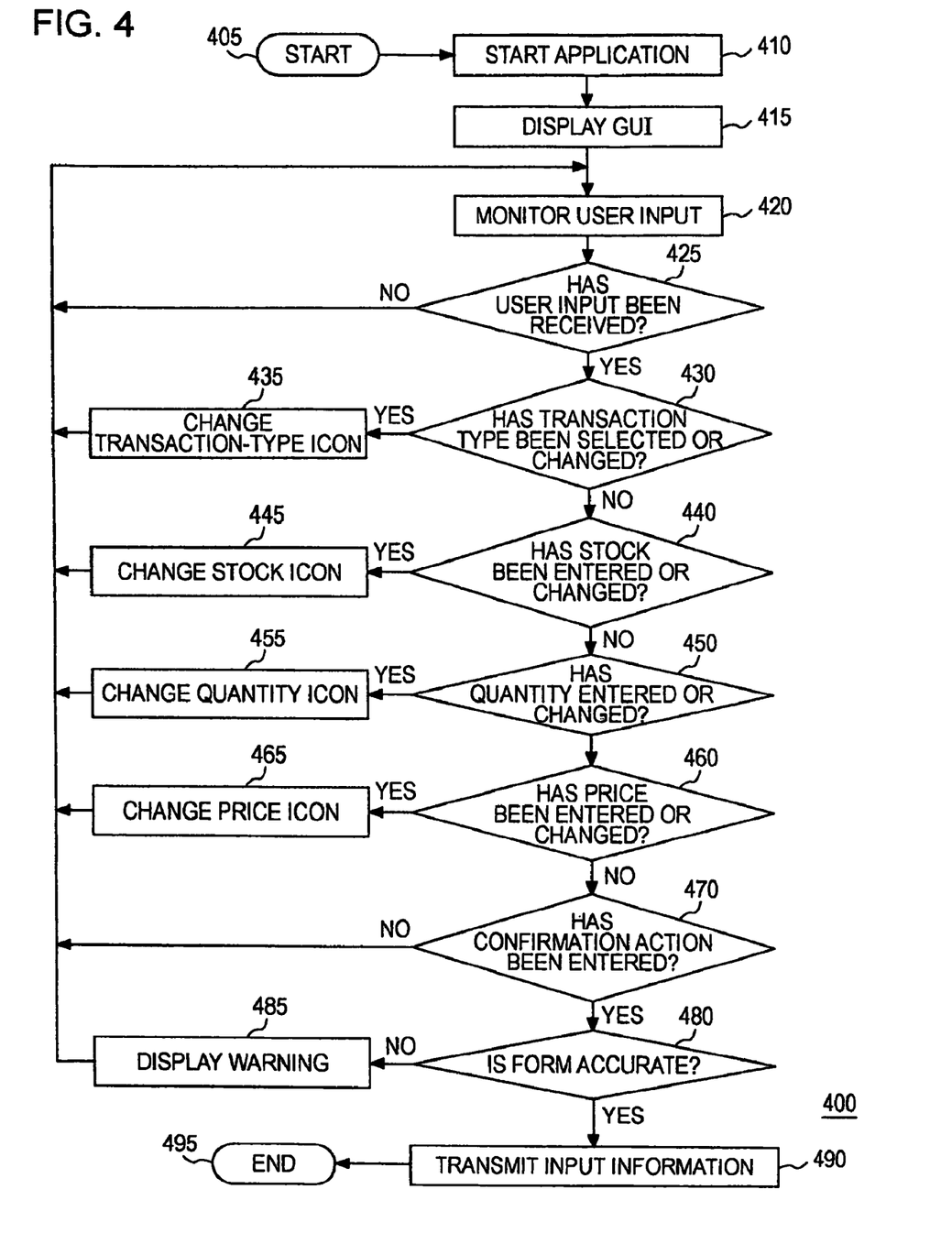
FIG. 4 shows a flowchart illustrating an operation of the client computer when a user enters information required for electronically performing stock trading according to the embodiment of the present invention.

FIG. 4 shows a flowchart 400 illustrating an operation of the client computer 100 when a user enters information required for electronically performing stock trading according to the present embodiment. The processing starts at step 405. Next, in step 410, in response to an application start action from a user (e.g., a double click on an icon representing the application on a desktop), the client program 330 for performance of an electronic-commerce transaction is started. In response to the starting of the client program 330 in step 410, the GUI display control unit 320 generates a window that is a GUI corresponding to the client program 330 on the desktop in the operating system (step 415). An example of a desktop screen appearing after step 415 is complete will now be described below with reference to FIG. 5.

Figure 5:
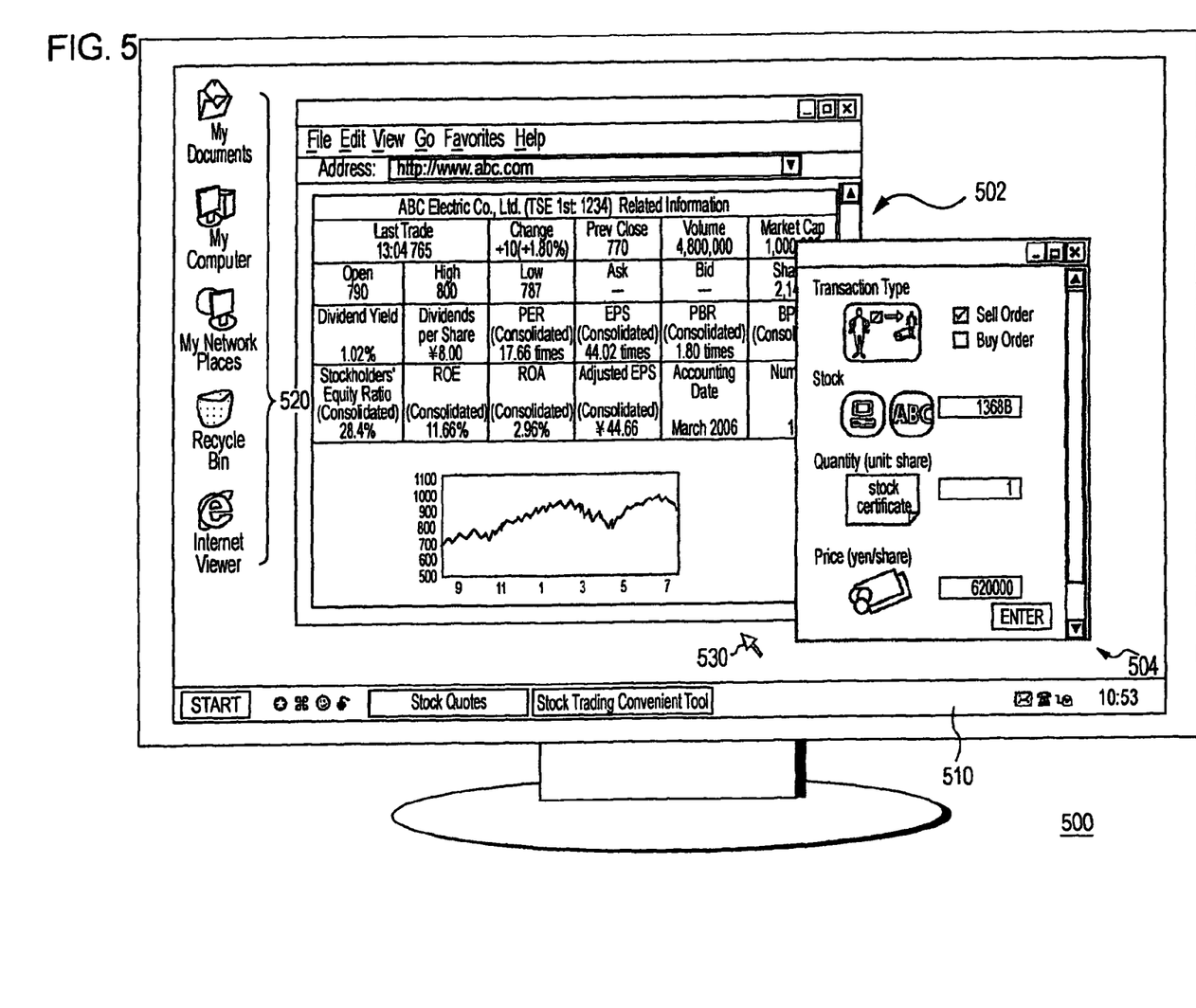
FIG. 5 shows an example of a desktop screen displayed on the client computer according to the embodiment of the present invention.

FIG. 5 illustrates an example of a desktop screen 500 displayed on the client computer 100 according to the present embodiment. On the desktop screen 500, windows 502 and 504, a taskbar 510, icons 520, and a pointer 530 are displayed. Each of the windows 502 and 504 represents an application that is currently running in the form of a window. In the present embodiment, the window 502 is a window corresponding to a web browser and visually provides a user with information about stock trading on the basis of data received from a server on the network 110. In the present embodiment, the window 504 is a window corresponding to the client program 330 for performance of a buy and/or sell order in an electronic commerce transaction.

The taskbar 510 is a bar for visually providing features of the operating system in the client computer 100. On the taskbar 510, a START button used for starting an application and icons for the clock and other resident applications are displayed. Each of the icons 520 represents a program, a directory (folder), or a file. In the present embodiment, when a user double-clicks an icon representing an application program with the pointer 530 by using a mouse, the application program is started and then a window corresponding thereto is displayed. The details of such a multi-window operating system are well known to those skilled in the art, so the detailed description is omitted.

Figure 6:
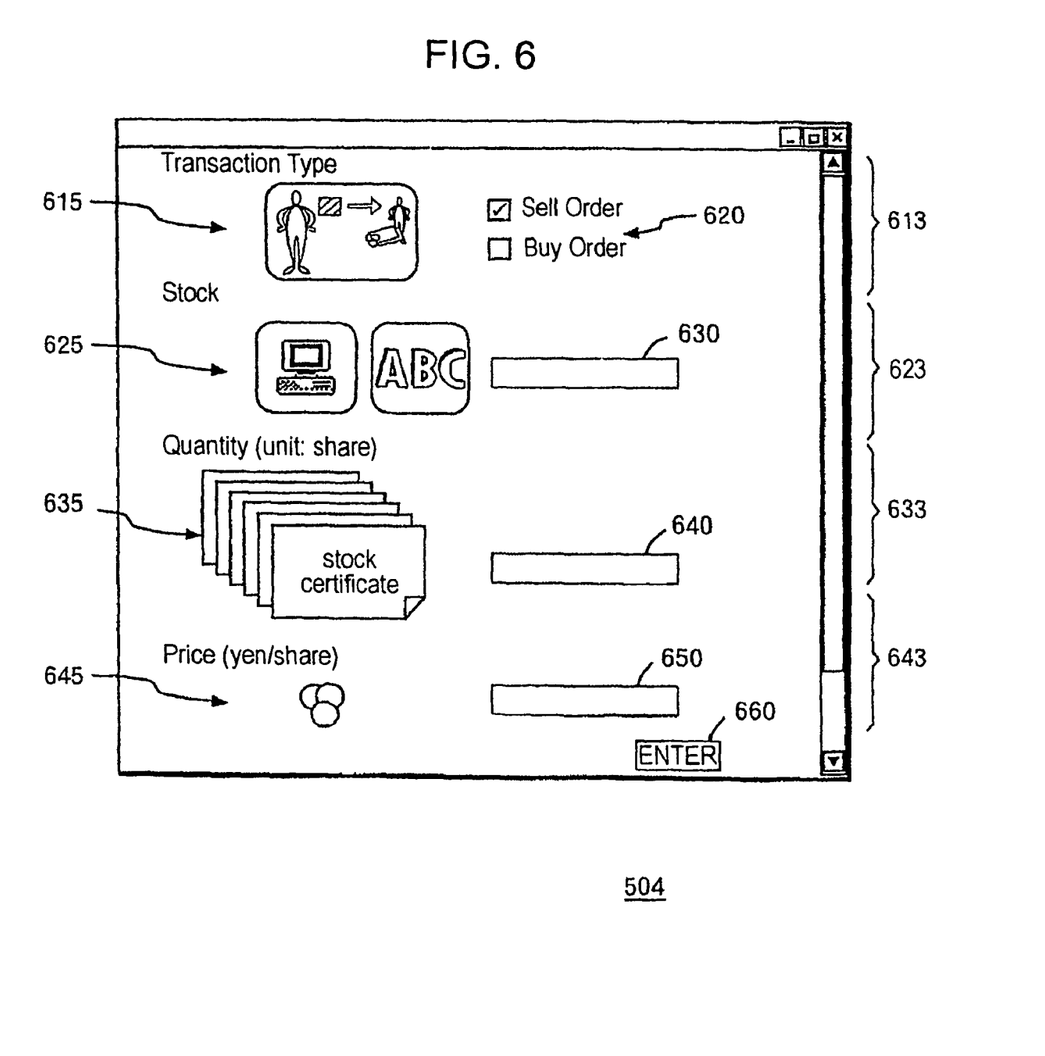
FIG. 6 shows an example of a GUI used for performing a buy or sell order in electronic commerce according to the embodiment of the present invention.

The window 504 for performance of a buy and/or sell order in an electronic commerce transaction displayed on the desktop screen 500 according to the present embodiment will now be described with reference to FIG. 6. The window 504 contains a transaction-type specifying region 613 for specifying the type of a transaction (buy or sell order), a transaction-stock specifying region 623 for specifying a stock code or symbol targeted for trading, a share-quantity specifying region 633 for specifying the quantity of shares to buy or sell, a share-price specifying region 643 for specifying a limit price of a share to be traded, and an ENTER button 660. When a user clicks the ENTER button 660 while information required for performance of stock trading that the user is willing to carry out has been entered in each of the specifying regions, information pieces entered in input fields 620, 630, 640, and 650 are then transmitted to the electronic-commerce server 120 and the electronic-commerce program is executed.

It is to be noted that the transaction-type specifying region 613, transaction-stock specifying region 623, share-quantity specifying region 633, and share-price specifying region 643 contain icon display areas 615, 625, 635, and 645, respectively, in addition to the input fields 620, 630, 640, and 650.

Figure 7:
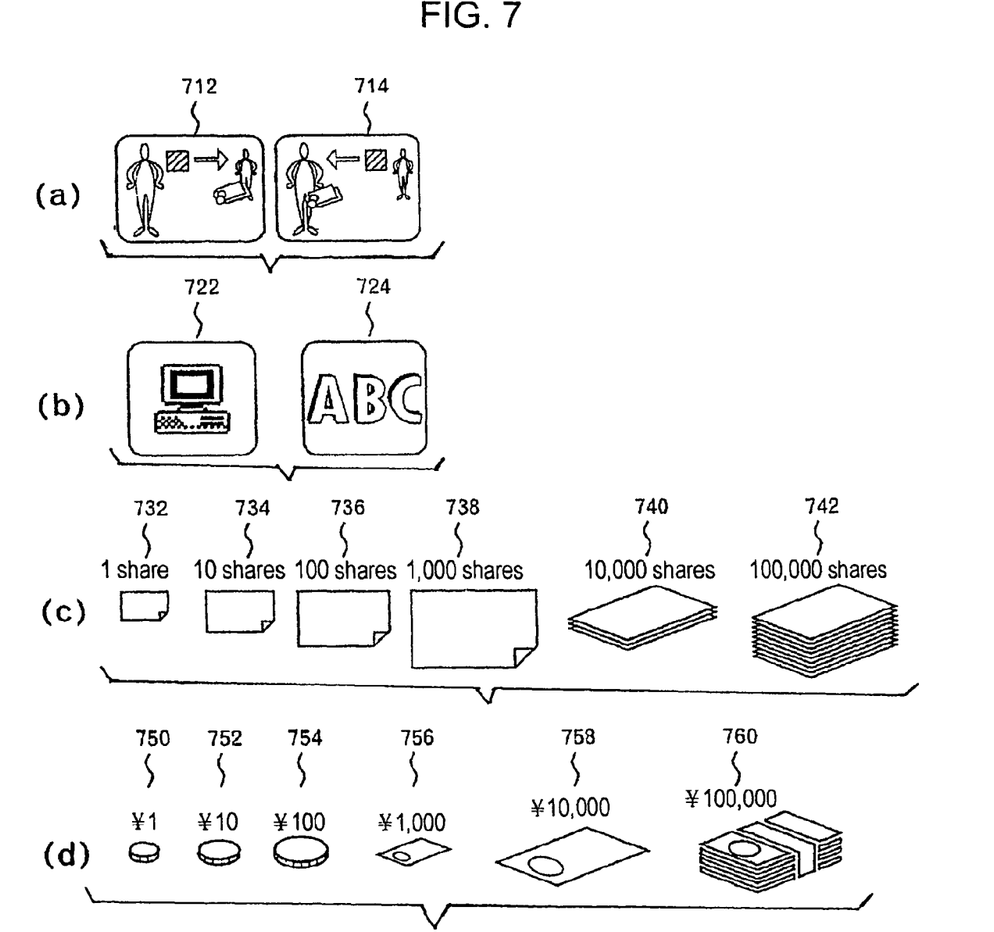
FIGS. 7(a) to 7(d) show examples of icons to be displayed in the GUI according to the embodiment of the present invention.

FIGS. 7(*a*) to 7(*d*) illustrate examples of icons to be displayed in the icon display areas 615, 625, 635, and 645. The icons illustrated in FIG. 7(*a*) can be displayed in the icon display area 615 so as to correspond to a transaction type specified in the input field 620 within the transaction-type specifying region 613. More specifically, an icon 712 is a pictorial representation of a sell order for shares, and an icon 714 is a pictorial representation of a buy order for shares. The input field 620 in FIG. 6 comprises a checked (✓) text description of the specified transaction type (checked Buy Order/Sell Order) displayed adjacent to the buy/sell icon (714/712).

The icons illustrated in FIG. 7(*b*) can be displayed in the icon display area 625 so as to correspond to a stock code or symbol entered in the input field 630 within the transaction-stock specifying region 623. More specifically, an icon 722 is a graphical image that represents that the type of business of ABC Co., Ltd. (imaginary company), whose shares can be traded by a user, is the computer industry. An icon 724 represents a logo of the ABC Co., Ltd. Although not illustrated in the drawing, in the present embodiment, icons representing the type of business and logo for each of all corporations whose shares can be traded by a user are stored in the icon recording unit 325.

The icons illustrated in FIG. 7(*c*) can be displayed in the icon display area 635 so as to correspond to a numeric value entered in the input field 640 within the share-quantity specifying region 633. More specifically, share quantity icons 732, 734, 736, 738, 740, and 742 represent 1 share, 10 shares, 100 shares, 1,000 shares, 10,000 shares, and 100,000 shares, respectively. Note that the share quantity icons 732, 734, 736, 738, 740, and 742 have different sizes and different shapes, wherein each size and shape represents a unique quantity of shares. In the present embodiment, for each digit of a numeric value entered in the input field 640 in the share-quantity specifying region 633, one or more share quantity icons that correspond in number to the magnitude of a numeric value of the digit is displayed. For example, when a numeric value of 1234 is entered in the input field 640, one icon 738, two icons 736, three icons 734, and four icons 732 are displayed. Thus, the numeric value (1234) is expressed in terms of the unique quantity of shares (1000, 100, 10, 1) represented by each share quantity icon (738, 736, 734, 732). The numeric value (1234) is displayed in the input field 640 adjacent to the share quantity icons in the icon display area 635 as illustrated by the numeric value of 620000 depicted in FIG. 8.

The icons illustrated in FIG. 7(*d*) can be displayed in the icon display area 645 so as to correspond to a numeric value entered in the input field 650 within the share-price specifying region 643. More specifically, share price icons 750, 752, 754, 756, 758, and 760 represent 1 yen, 10 yen, 100 yen, 1,000 yen, 10,000 yen, and 100,000 yen, respectively. Note that the share price icons 750, 752, 754, 756, 758, and 760 have different sizes and different shapes, wherein each size and shape represents a unique limit price per share of the stock to be traded. In the present embodiment, for each digit of a numeric value entered in the input field 650 in the share-price specifying region 643, one or more share price icons that correspond in number to the magnitude of a numeric value of the digit of the entered numeric value is displayed. For example, when a numeric value of 1234 is entered in the input field 650, one icon 756, two icons 754, three icons 752, and four icons 750 are displayed. Thus, the numeric value (1234) is expressed in terms of the unique price per share (1000, 100, 10, 1) represented by each share price icon (756, 754, 752, 750). The numeric value (1234) is displayed in the input field 650 adjacent to the share price icons in the icon display area 645 as illustrated by the numeric value of 1 depicted in FIG. 8.

In the present embodiment, the correspondence between information pieces entered in the input fields and icons displayed in the icon display areas is defined by the input item/icon correspondence table 340. The GUI display control unit 320 causes icons to be displayed in the icon display areas 615, 625, 635, and 645 on the basis of the input item/icon correspondence table 340.

Referring back to FIG. 4, flow proceeds to step 420. In step 420, the input monitoring unit 335 monitors a user input to the window 504. Then, in step 425, the input monitoring unit 335 determines whether a user input to the window 504 has been detected. If, in step 425, it is determined that no user input has been detected, flow returns from step 425 through the NO arrow to step 420, where monitoring a user input continues.

If, in step 425, it is determined that a user input has been detected, flow proceeds from step 425 through the YES arrow to step 430, where it is determined whether the detected user input is a change in the transaction type. If, in step 430, it is determined that the detected user input is a change in the transaction type, flow proceeds from step 430 through the YES arrow to step 435, where an icon displayed in the transaction-type specifying region 613 is changed to an icon that corresponds to the changed transaction type. After the icon is changed, flow returns to step 420, where monitoring a user input continues.

If, in step 430, it is determined that the detected user input is not a change in the transaction type, flow proceeds from step 430 through the NO arrow to step 440, where it is determined whether the detected user input is a change in the stock to be traded. If, in step 440, it is determined that the detected user input is a change in the stock to be traded, flow proceeds from step 440 through the YES arrow to step 445, where an icon displayed in the transaction-stock specifying region 623 is changed to an icon that corresponds to the type of business and logo of the changed stock. After the icon is changed, flow returns to step 420, where monitoring a user input continues.

If, in step 440, it is determined that the detected user input is not a change in the stock to be traded, flow proceeds from step 440 through the NO arrow to step 450, where it is determined whether the detected user input is a change in the quantity of shares to be traded. If, in step 450, it is determined that the detected user input is a change in the quantity of shares to be traded, flow proceeds from step 450 through the YES arrow to step 455, where an icon displayed in the share-quantity specifying region 633 is changed to an icon that corresponds to a numeric value of the changed quantity. After the icon is changed, flow returns to step 420, where monitoring a user input continues.

If, in step 450, it is determined that the detected user input is not a change in the quantity of shares to be traded, flow proceeds from step 450 through the NO arrow to step 460, where it is determined whether the detected user input is a change in the limit price of a share to be traded. If, in step 460, it is determined that the detected user input is a change in the limit price of a share to be traded, flow proceeds from step 460 through the YES arrow to step 465, where an icon displayed in the share-price specifying region 643 is changed to an icon that corresponds to a numeric value of the changed limit price. After the icon is changed, flow returns to step 420, where monitoring a user input continues.

If, in step 460, it is determined that the detected user input is not a change in the limit price of a share to be traded, flow proceeds from step 460 through the NO arrow to step 470, where it is determined whether the detected user input is a transmission action for transmitting necessary data to the electronic-commerce server (in the present embodiment, clicking on the ENTER button 660). If, in step 470, it is determined that the detected user input is not a transmission action, flow returns from step 470 through the NO arrow to step 420, where monitoring a user input continues.

If, in step 470, it is determined that the detected user input is a transmission action, flow proceeds from step 470 through the YES arrow to step 480, where a form check is conducted to determine whether the requirements for the form check are satisfied. Examples of the form check include checking whether a user is qualified to conduct a transaction whose scale is aimed by the user. If, in step 480, it is determined that the requirements for the form check are not satisfied, flow proceeds from step 480 through the NO arrow to step 485, where a notification that the user has not passed the form check is issued to the user. Then, flow returns to step 420, where monitoring a user input continues.

If, in step 480, it is determined that the requirements for the form check are satisfied, flow proceeds from step 480 through the YES arrow to step 490, where the transmitting and receiving unit 345 transmits information required for performance of the electronic-commerce transaction entered via the GUI to the electronic-commerce server 120. Then, flow proceeds to step 495, where the processing is complete.

Figure 8:
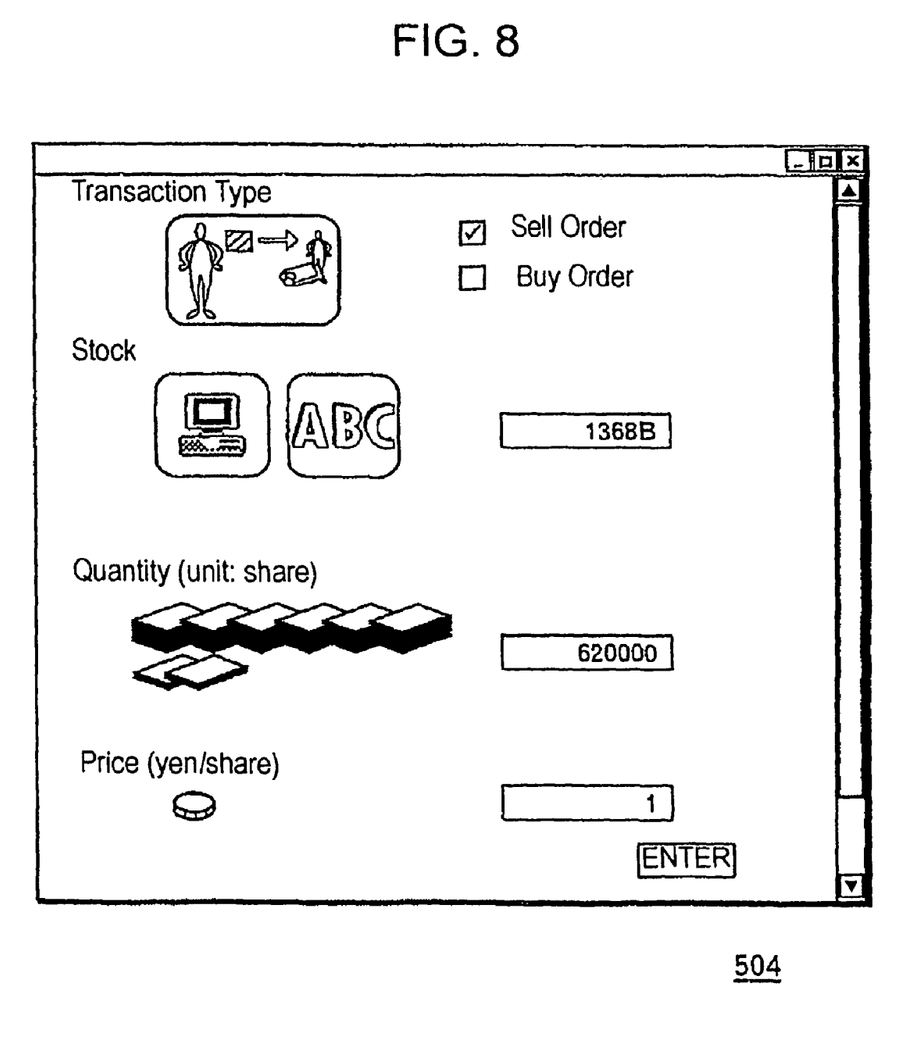
FIG. 8 shows one scene of a GUI used for performance of a sell or buy order in electronic commerce according to the embodiment of the present invention.
Figure 9:
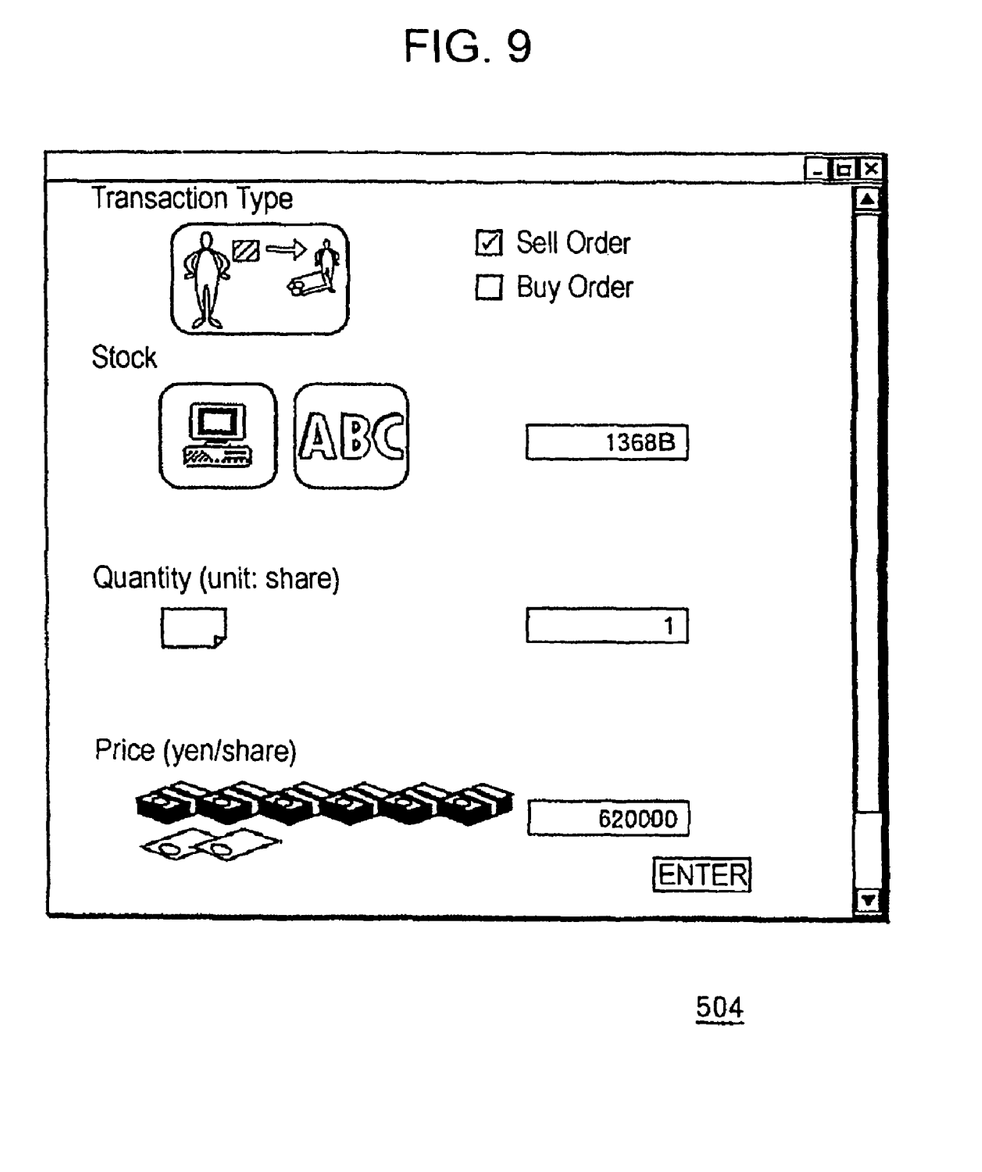
FIG. 9 shows another scene of a GUI used for performance of a sell or buy order in electronic commerce according to the embodiment of the present invention.

One situation that occurs when a user is willing to perform an electronic-commerce transaction for a buy or sell order according to the present embodiment will now be described with reference to FIGS. 8 and 9. In this situation, the user first enters the transaction type, stock, quantity, and price as illustrated in FIG. 8 to tentatively sell only one share for ABC CO., Ltd. (stock code: 1368B), which manufactures and sells computers, at 620,000 yen. In this case, since the quantity and the price are reversely entered, clicking the ENTER button w and transmitting data to the electronic-commerce server 120 without changing the entered information can possibly cause an enormous loss to the user.

At this time, in the present embodiment, many icons representing stock certificates are displayed in the icon display area 635 in the share-quantity specifying region 633, and only one icon having a coin shape is displayed in the icon display area 645 in the share-price specifying region 643. Therefore, the user can intuitively sense an error in the entered numeric values and can be thus deterred from clicking the ENTER button. In the present embodiment, after the user who has been deterred from clicking the ENTER button reenters appropriate information as illustrated in FIG. 9 and confirms the input, the user clicks the ENTER button. As a result, the user can be avoided from performing an incorrect input and can conduct electronic stock trading as desired.

If the user specifies a wrong transaction type, for example, since a different icon is displayed in the icon display area 615 in the transaction-type specifying region 613 in the present embodiment, the user can intuitively sense his/her error without having to stop operation. If the user selects a wrong corporation that has a company name similar to a corporation whose shares are a target for trading to the user, since an icon representing a logo of a corporation is displayed in the icon display area 625 in the transaction-stock specifying region 623 in the present embodiment, the user can intuitively sense his/her error without having to stop operation.

Furthermore, even if the user selects a wrong corporation that uses a logo similar to a corporation whose shares are a target for trading to the user (for example, a corporation in a different type of business that belongs to a corporate family that has the same company name), since an icon representing a type of business is displayed in the icon display area 625 in the transaction-stock specifying region 623 in the present embodiment, the user can intuitively sense his/her error without having to stop operation.

As described above, a probability is dramatically increased that, even if a user reversely enters numeric values of a quantity of shares for an order and a limit price of a share, the user will sense the error before clicking an ENTER button and thus an incorrect input is prevented from being transmitted. As a result, it is easily understood that the present embodiment can support a user to promptly and accurately enter information required for performance of an electronic-commerce transaction.

The invention can be implemented in hardware, software, or a combination of both. A typical example of the combination of hardware and software is execution in a data processing system having a predetermined program. In this case, by being loaded into the data processing system and being executed, the program controls the data processing system and causes the processing according to the invention to be executed. The program consists of instructions that can be represented by any language, code, and notation. The instructions enable the system to perform a specific function directly or after either one of (1) conversion into another language, code, and notation and (2) reproduction to another medium or both.

The scope of the invention includes a medium storing a program, in addition to the program itself. The program for performing the functions of the invention can be stored in any computer-readable recording medium, such as an FD, an MO, a CD-ROM, a DVD, an HDD, a ROM, an MRAM, and a RAM. To be stored in the recording medium, the program can be downloaded from other data processing systems connected thereto via a communication line and can be reproduced from another recording medium. The program can be compressed or divided into a plurality of portions and can be stored in a single or a plurality of recording media. Note that a program product implementing the invention can be provided in various forms.

It should be obvious to those skilled in the art that after reading the above description of the preferred embodiment, various modifications and improvements can be added to the embodiment described above. For example, although online stock trading has been described in the embodiment of the invention, it is, of course, understood that the invention is applicable to all electronic-commerce fields. In addition to that, there is a possibility that the invention is applicable to all other applications that allow a human to enter a numeric value or other information through a GUI.

In the present embodiment, icons whose sizes and shapes are different according the digits of an entered numeric value are displayed. However, an icon whose size is merely proportional to the magnitude of a numeric value can be displayed. In addition to the use of different sizes and shapes, the difference between icons can be expressed by use of different colors. In other words, embodiments on which such changes and modifications are added are also included in the technical scope of the invention.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for, in a computer system connected to an electronic-commerce server, supporting an input of a numeric value required for performance of an electronic-commerce transaction, the method comprising:

a processor of the computer system displaying, on a display unit of the computer system, a user input screen comprising areas for user input to be entered for describing said electronic-commerce transaction consisting of a transaction of a stock to be traded, wherein the stock is associated with a business;

said processor receiving said user input entered on the user input screen, wherein said entered user input comprises parameters of the transaction, wherein the parameters of the transaction specify a transaction type selected from the group consisting of a buy order and a sell order, a stock code identifying the stock to be traded, and a quantity of shares of the stock to be traded expressed as a first numeric value of the number of shares of the stock to be traded;

in response to said receiving the user input, said processor displaying, on the display unit, a window that displays a representation of the transaction in terms of the received user input, wherein the displayed representation of the transaction comprises:

a buy/sell icon consisting of a pictorial representation of the specified transaction type;

a stock code icon consisting of a logo denoting the specified stock code;

one or more share quantity icons, wherein each share quantity icon of the one or more share quantity icons has a size and shape that represents a unique quantity of shares, and wherein the one or more share quantity icons collectively represent the first numeric value expressed in terms of the unique quantity of shares represented by each share quantity icon of the one or more share quantity icons; and wherein the one or more share quantity icons consists of I share quantity icons, and wherein the method further comprises: expressing the first numeric value as a sum of N terms denoted as $S_0, S_1, \ldots, S_{N-1}$, wherein N is at least 2, wherein $S_n = K_n \times 10^n$ for $n=0, 1, \ldots, N-1$ wherein $K_n$ is zero or a positive integer for $n=0, 1, \ldots, N-1$, wherein I terms of the N terms have a non-zero value, wherein I is at least 2, and wherein the at least one share quantity icon in the displayed representation of the transaction consists of I share quantity icons respectively corresponding to the I terms.

2. The method of claim 1, wherein the displayed representation of the transaction further comprises a business type icon displayed adjacent to the stock code icon, and wherein the business type icon is a graphical image that denotes a type of the business that the stock is associated with.

3. The method of claim 1, wherein the displayed representation of the transaction further comprises:

a checked text description of the specified transaction type displayed adjacent to the buy/sell icon; and the first numeric value displayed adjacent to the one or more share quantity icons.

4. The method of claim 1, wherein the parameters of the transaction specify a limit price per share of the stock to be traded expressed as a second numeric value of the limit price per share of the stock to be traded, and wherein the displayed representation of the transaction further comprises one or more share price icons, wherein each share price icon of the one or more share price icons has a size and shape that represents a unique limit price per share of the stock to be traded, and wherein the one or more share price icons collectively represent the second numeric value expressed in terms of the unique limit price per share represented by each share price icon of the one or more share price icons.

5. The method of claim 4, wherein the one or more share price icons consist of J share price icons, and wherein the method further comprises:

expressing the second numeric value as a sum of M terms denoted as $P_0, P_1, \ldots, P_{M-1}$, wherein M is at least 2, wherein $P_m = L_m \times 10^n$ for $m = 0, 1, \ldots, M-1$, wherein $L_m$ is zero or a positive integer for $m = 0, 1, \ldots, M-1$, wherein J terms of the M terms have a non-zero value, wherein J is at least 2, and wherein the at least one share price icon in the displayed representation of the transaction consists of J share price icons respectively corresponding to the J terms.

6. The method of claim 4, wherein the displayed representation of the transaction further comprises the second numeric value displayed adjacent to the at least one share price icon.

7. A computer program product, comprising a computer readable storage device having a computer readable program code stored therein, said computer readable program code containing instructions configured to be executed by a processor of a computer system to implement a method for supporting an input of a numeric value required for performance of an electronic-commerce transaction, the method comprising:

displaying, on a display unit of the computer system, a user input screen comprising areas for user input to be entered for describing said electronic-commerce transaction consisting of a transaction of a stock to be traded, wherein the stock is associated with a business;

receiving said user input entered on the user input screen, wherein said entered user input comprises parameters of the transaction, wherein the parameters of the transaction specify a transaction type selected from the group consisting of a buy order and a sell order, a stock code identifying the stock to be traded, and a quantity of shares of the stock to be traded expressed as a first numeric value of the number of shares of the stock to be traded;

in response to said receiving the user input, displaying, on the display unit, a window that displays a representation of the transaction in terms of the received user input, wherein the displayed representation of the transaction comprises:

a buy/sell icon consisting of a pictorial representation of the specified transaction type;

a stock code icon consisting of a logo denoting the specified stock code;

one or more share quantity icons, wherein each share quantity icon of the one or more share quantity icons has a size and shape that represents a unique quantity of shares, and wherein the one or more share quantity icons collectively represent the first numeric value expressed in terms of the unique quantity of shares represented by each share quantity icon of the one or more share quantity icons; and wherein the one or more share quantity icons consists of I share quantity icons, and wherein the method further comprises: expressing the first numeric value as a sum of N terms denoted as $S_0, S_1, \ldots, S_{N-1}$, wherein N is at least 2, wherein $S_n = K_n \times 10^n$ for $n = 0, 1, \ldots, N-1$ wherein $K_n$ is zero or a positive integer for $n = 0, 1, \ldots, N-1$ wherein I terms of the N terms have a non-zero value, wherein I is at least 2, and wherein the at least one share quantity icon in the displayed representation of the transaction consists of I share quantity icons respectively corresponding to the I terms.

8. The computer program product of claim 7, wherein the displayed representation of the transaction further comprises a business type icon displayed adjacent to the stock code icon, and wherein the business type icon is a graphical image that denotes a type of the business that the stock is associated with.

9. The computer program product of claim 7, wherein the displayed representation of the transaction further comprises:

a checked text description of the specified transaction type displayed adjacent to the buy/sell icon; and the first numeric value displayed adjacent to the one or more share quantity icons.

10. The computer program product of claim 7, wherein the parameters of the transaction specify a limit price per share of the stock to be traded expressed as a second numeric value of the limit price per share of the stock to be traded, and wherein the displayed representation of the transaction further comprises one or more share price icons, wherein each share price icon of the one or more share price icons has a size and shape that represents a unique limit price per share of the stock to be traded, and wherein the one or more share price icons collectively represent the second numeric value expressed in terms of the unique limit price per share represented by each share price icon of the one or more share price icons.

11. The computer program product of claim 10, wherein the one or more share price icons consist of J share price icons, and wherein the method further comprises:

expressing the second numeric value as a sum of M terms denoted as $P_0, P_1, \ldots, P_{M-1}$, wherein M is at least 2, wherein $P_m = L_m \times 10^n$ for $m = 0, 1, \ldots, M-1$, wherein $L_m$ is zero or a positive integer for $m = 0, 1, \ldots, M-1$, wherein J terms of the M terms have a non-zero value, wherein J is at least 2, and wherein the at least one share price icon in the displayed representation of the transaction consists of J share price icons respectively corresponding to the J terms.

12. The computer program product of claim 10, wherein the displayed representation of the transaction further comprises the second numeric value displayed adjacent to the at least one share price icon.

13. A computer system comprising a processor and a computer readable memory unit coupled to the processor, said memory unit containing program code configured to be executed by the processor to implement a method for supporting an input of a numeric value required for performance of an electronic-commerce transaction, the method comprising:

displaying, on a display unit of the computer system, a user input screen comprising areas for user input to be entered for describing said electronic-commerce transaction consisting of a transaction of a stock to be traded, wherein the stock is associated with a business;

receiving said user input entered on the user input screen, wherein said entered user input comprises parameters of the transaction, wherein the parameters of the transaction specify a transaction type selected from the group consisting of a buy order and a sell order, a stock code identifying the stock to be traded, and a quantity of shares of the stock to be traded expressed as a first numeric value of the number of shares of the stock to be traded;

in response to said receiving the user input, displaying, on the display unit, a window that displays a representation of the transaction in terms of the received user input, wherein the displayed representation of the transaction comprises:

a buy/sell icon consisting of a pictorial representation of the specified transaction type;

a stock code icon consisting of a logo denoting the specified stock code;

one or more share quantity icons, wherein each share quantity icon of the one or more share quantity icons has a size and shape that represents a unique quantity of shares, and wherein the one or more share quantity icons collectively represent the first numeric value expressed in terms of the unique quantity of shares represented by each share quantity icon of the one or more share quantity icons; and wherein the one or more share quantity icons consists of I share quantity icons, and wherein the method further comprises: expressing the first numeric value as a sum of N terms denoted as $S_0, S_1, \ldots, S_{N-1}$, wherein N is at least 2, wherein $S_n = K_n \times 10^n$ for $n=0, 1, \ldots, N-I$ wherein $K_n$ is zero or a positive integer for $n=0, 1, \ldots, N-1$ wherein I terms of the N terms have a non-zero value, wherein I is at least 2, and wherein the at least one share quantity icon in the displayed representation of the transaction consists of I share quantity icons respectively corresponding to the I terms.

14. The computer system of claim 13, wherein the displayed representation of the transaction further comprises a business type icon displayed adjacent to the stock code icon, and wherein the business type icon is a graphical image that denotes a type of the business that the stock is associated with.

15. The computer system of claim 13, wherein the displayed representation of the transaction further comprises:
a checked text description of the specified transaction type displayed adjacent to the buy/sell icon; and
the first numeric value displayed adjacent to the one or more share quantity icons.

16. The computer system of claim 13, wherein the parameters of the transaction specify a limit price per share of the stock to be traded expressed as a second numeric value of the limit price per share of the stock to be traded, and wherein the displayed representation of the transaction further comprises one or more share price icons, wherein each share price icon of the one or more share price icons has a size and shape that represents a unique limit price per share of the stock to be traded, and wherein the one or more share price icons collectively represent the second numeric value expressed in terms of the unique limit price per share represented by each share price icon of the one or more share price icons.

17. The computer system of claim 16, wherein the one or more share price icons consist of J share price icons, and wherein the method further comprises:
expressing the second numeric value as a sum of M terms denoted as $P_0, P_1, \ldots, P_{M-1}$, wherein M is at least 2, wherein $P_m = L_m \times 10^n$ for $m=0, 1, \ldots, M-1$, wherein $L_m$ is zero or a positive integer for $m=0, 1, \ldots, M-1$, wherein J terms of the M terms have a non-zero value, and wherein J is at least 2, wherein the at least one share price icon in the displayed representation of the transaction consists of J share price icons respectively corresponding to the J terms.

* * * * *